United States Patent
Wang

(10) Patent No.: US 10,383,273 B2
(45) Date of Patent: Aug. 20, 2019

(54) COASTAL SEVERE SALINE-ALKALI SOIL IMPROVEMENT AND VEGETATION CONSTRUCTION SYSTEM

(71) Applicant: Shandong Sunway Landscape Technology Co., Ltd., Weifang (CN)

(72) Inventor: Sheng Wang, Weifang (CN)

(73) Assignee: SHANDONG SUNDAY SALINE-ALKALI LAND TECHNOLOGY CO., LTD., Weifang (CN)

( * ) Notice: Subject to any disclaimer, the term of this patent is extended or adjusted under 35 U.S.C. 154(b) by 0 days.

(21) Appl. No.: 15/525,950

(22) PCT Filed: Oct. 28, 2015

(86) PCT No.: PCT/CN2015/093001
§ 371 (c)(1),
(2) Date: May 10, 2017

(87) PCT Pub. No.: WO2017/063229
PCT Pub. Date: Apr. 20, 2017

(65) Prior Publication Data
US 2019/0090409 A1    Mar. 28, 2019

(30) Foreign Application Priority Data

Oct. 12, 2015 (CN) .......................... 2015 1 0655621

(51) Int. Cl.
| | |
|---|---|
| *A01B 79/02* | (2006.01) |
| *A01G 2/00* | (2018.01) |
| *A01G 17/00* | (2006.01) |
| *A01B 77/00* | (2006.01) |
| *A01G 25/00* | (2006.01) |
| *G05B 19/418* | (2006.01) |
| *A01C 21/00* | (2006.01) |
| *A01G 7/00* | (2006.01) |
| *A01G 25/02* | (2006.01) |
| *B09C 1/02* | (2006.01) |
| *B09C 1/08* | (2006.01) |
| *C05B 1/02* | (2006.01) |
| *C05F 3/00* | (2006.01) |

(52) U.S. Cl.
CPC .............. *A01B 79/02* (2013.01); *A01B 77/00* (2013.01); *A01C 21/00* (2013.01); *A01G 2/00* (2018.02); *A01G 7/00* (2013.01); *A01G 17/00* (2013.01); *A01G 17/005* (2013.01); *A01G 25/00* (2013.01); *A01G 25/02* (2013.01); *B09C 1/02* (2013.01); *B09C 1/08* (2013.01); *C05B 1/02* (2013.01); *C05F 3/00* (2013.01); *G05B 19/418* (2013.01); *B09C 2101/00* (2013.01); *Y02A 40/241* (2018.01)

(58) Field of Classification Search
CPC . A01B 79/02; A01G 2/00; A01G 7/00; A01G 17/005; A01C 21/00
See application file for complete search history.

(56) References Cited

FOREIGN PATENT DOCUMENTS

| CN | 101743882 A | * | 6/2010 | |
|---|---|---|---|---|
| CN | 104472052 A | * | 4/2015 | |
| CN | 104854995 A | * | 8/2015 | |
| CN | 104904365 A | * | 9/2015 | |
| WO | WO-2008117658 A1 | * | 10/2008 | ............. E02D 17/20 |

* cited by examiner

Primary Examiner — Monica L Williams
(74) Attorney, Agent, or Firm — Matthias Scholl P.C. Scholl, Matthias

(57) ABSTRACT

A coastal severe saline-alkali soil improvement and vegetation construction system consists of four parts of content, respectively a soil improvement part, a saline-alkaline tolerant plant resource utilization and planting technology part, an irrigation and drainage mating system part, and a part for managing saline-alkaline soil improvement and operation by adopting an automated information technology. A whole set of complete operation system is formed for performing improvement and vegetation construction on saline-alkaline soil from the four parts, thereby providing a feasible high-efficiency method for saline-alkali soil improvement of a coastal region.

8 Claims, No Drawings

COASTAL SEVERE SALINE-ALKALI SOIL IMPROVEMENT AND VEGETATION CONSTRUCTION SYSTEM

CROSS-REFERENCE TO RELATED APPLICATIONS

This application is a National Stage Appl. filed under 35 USC 371 of International Patent Application No. PCT/CN2015/093001 with an international filing date of Oct. 28, 2015, designating the U.S., now pending, and further claims foreign priority benefits to Chinese Patent Application No. 201510655621.8 filed Oct. 12, 2015. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

FIELD OF THE INVENTION

The invention relates to the field of amelioration of the saline-alkaline land, and more particularly to a method for removing salt from soil in a coastal saline-alkaline land.

BACKGROUND OF THE INVENTION

Land salinization is a global problem faced by the mankind China has a large area of salinized land, which is mainly distributed in the North China Plain, the Northeast Plain, the inland of the Northwest, and the coastal regions. The survival rate of plants grown in saline-alkaline soils is generally very low, thus seriously affecting China's agricultural and forestry production.

Too much salt in the soil results in salt damage, which affects normal growth of plants. Salinity causes harms to plants in two ways: first, poisoning, when plants absorb a large quantity of sodium or chloride ions, the structure and the function of the cell membrane change, which ultimately causes plant death; second, improving the osmotic pressure of the soil, which inhibits the absorption of the plant roots, so that it is difficult for the plant to absorb water, cell dehydration and plant wilting occur, and finally plant death is resulted. Therefore, reasonable use of saline land, complete amelioration of the saline-alkaline land, and cultivation of varieties of salt-resistant plants are future developing directions.

At present, the distribution of saline-alkaline land in China is as follows:

1. Saline-alkaline lands in Northwest inland include: most parts of Xinjiang, Qaidam Basin in Qinghai, Hexi Corridor in Gansu, and western Inner Mongolia.

2. The semi-arid Saline-alkaline lands of the upper and middle reaches of the Yellow River include: Qinghai, eastern Gansu, Ningxia, Inner Mongolia, the Hetao region, Shaanxi, and valley plains in Shanxi.

3. Arid and semi-arid depression saline-alkaline lands in Huanghuaihai Plain include: the lower reaches of the Yellow River, the Haihe River Plain, Huanghuai plain, across Beijing-Tianjin-Hebei-Shandong-Henan and northern Anhui northern Jiangsu.

4. Semi-humid semi-arid low-lying saline-alkaline lands in the Northeast include: including the Songnen Plain, Liaoxi Basin, Sanjiang Plain, and Hulunbeir area.

5. Coastal semi-humid saline-alkaline lands include: including east, south and Jiangbei coastal areas.

TECHNICAL PROBLEM

As the environments of saline-alkaline lands are different, so the focus of the management is different. Taken the coastal semi-humid saline-alkaline land, which contains a large quantity of water-soluble salt or alkaline substances, as an example, because too much salt is accumulated in the soil, a series of physical properties of the soil are deteriorated: such as the clay saline-alkaline soil, featuring viscous structure, poor permeability, high volume weight, slow rises in the soil temperature, poor activity of the aerobic microbes in the soil, slow release of the nutrients, small permeability coefficient, and strong capillary; and sandy saline-alkaline soil, featuring low water capacity and soil fertility in the field, high salinity of soil saturation extraction, and serious salt concentration caused by soil evaporation.

The conventional method for desalting the saline-alkaline land using the single mode has the effect being much to be desired. Since different modes seriously restrict with one another. The effect of a combination of different single modes is not good, or even making the results much worse. For example, when the fertilizer modes and the biological modes are not incompatible, it results in deaths of organisms and returning of the absorbed salt to the soil; and when the physical modes and the water-washing is not incompatible, the underground water level is raised, and sea water encroachment is resulted. Thus, it is difficult to devise a comprehensive method for desalting the saline-alkaline land.

To solve the above described problems, a more suitable method for desalting the saline-alkaline land is provided in the invention, which includes soil amelioration and vegetation establishment.

SUMMARY OF THE INVENTION

In view of the above-described problems, it is one objective of the invention to provide a method for removing salt from soil in a severe coastal saline-alkaline land.

To achieve the above objective, in accordance with one embodiment of the invention, there is provided a method for removing salt from soil in a severe coastal saline-alkaline land. The method comprises: ameliorating soil, planting saline and alkaline-tolerant plant, configuring irrigation facilities, and managing ameliorated soil by automatic information technology, which are specifically conducted as follows:

I. Soil Amelioration Comprising: Construction of a Salt Removing System, Salt-Washing, and Soil Conditioning 1. Construction of Salt Removing System The salt removing system adopts open ditches and undersurface pipes. The open ditches, the undersurface pipes, and catch-pipes of the undersurface pipes communicate and work to drain salt.

a. The open ditches are excavated surrounding a saline-alkaline land to be treated. The open ditches have a width of between 0.4 and 0.6 m, a depth of between 0.8 and 1.6 m, and a slop of between 0.1% and 0.3%.

b. A salt-discharging pipe network is laid under a ground surface of the saline-alkaline land to be treated. The salt-discharging pipe network is formed by the undersurface pipes and the catch-pipes. The undersurface pipes are single-wall perforated corrugated pipes made of polyethylene, and a pipe diameter of the undersurface pipe is 110 mm. The undersurface pipes are wrapped with a layer of a sand filter material having a thickness of between 6 and 8 mm to prevent soil powder from blocking the undersurface pipes. The adopted sand filter material is natural sands of uniform size. The undersurface pipes are laid at an interval of between 5 and 30 m, and a top of each undersurface pipe is disposed at a depth of between 80 and 160 cm away from the ground surface of the saline-alkaline land. The undersurface pipes are laid at a slop of 0.5‰ according to the drainage direction of the soil layer of the saline-alkaline land, and rear ends of the undersurface pipes are all connected to the catch-pipes. The catch-pipes are PVC-U pipes having a diameter of 200 mm and are laid at a slop of 0.7‰.

2. Salt-washing and Soil Conditioning a. Soil above an eluvial horizon (E horizon) is turned over by an excavator. After the earth is dried, the soil is added with a soil conditioner, mechanically crushed and mixed. The soil conditioner is formed by between 2 and 5 parts by weight of sand, between 1 and 2 parts by weight of a straw, and between 0.3 and 1 part by weight of a desulfurized gypsum according to every 20 parts by weight of the soil.

b. the crushed and mixed soil is irrigated by using water pipes or sprinklers to enable the salt in the soil to seep along with water until a salt content in the soil is below 0.5%, in which, brackish water is employed in a first period of the water-washing, and freshwater is employed in a last period of the water-washing.

c. a fertilizer is applied to the saline-alkaline land, in which, the fertilizer comprises: between 40 and 50 parts by weight of a sheep/dairy manure, between 10 and 16 parts by weight of a biological carbon, between 18 and 24 parts by weight of a furfural residue, between 0.3 and 0.6 part by weight of a water retaining agent, between 4 and 10 parts by weight of a pyroligneous acid, between 2 and 8 parts by weight of calcium superphosphate, and between 4 and 6 parts by weight of a compound fertilizer.

II. Planting Saline and Alkaline-tolerant Plant

1. Planting Arbors a. An earth ball encircling roots of the arbor has a diameter of being between 6 and 8 folds of a diameter at breast height, and a diameter of a plant pit is 40 cm larger than the earth ball.

b. Water is filled into the plant pit before planting, and subsequent operation is conducted after the water penetration is finished.

c. A layer of the fertilizer for the saline-alkaline land having a thickness of between 2 and 3 cm is applied in the plant pit, the arbor is then planted, during which, the original soil and the fertilizer for the saline-alkaline land are mixed according to a weight ratio of 2:1 to fix the earth ball of the arbor in the plant pit until a surface of the mixture being between 5 and 10 cm below the ground surface.

d. the arbor is irrigated and covered with the original soil to a position above the ground surface to form a cofferdam. Thereafter, a layer of the fertilizer for the saline-alkaline land having a thickness of between 2 and 3 cm is covered in the vicinity of the plant pit and the cofferdam.

e. The arbor is supported by a bracket after planting.

f. The fertilizer for the saline-alkaline land is applied according to practical condition. Salt content of the soil layer encircling the roots is dynamically detected. When the salt content is below 0.3 wt. %, the fertilizer for the saline-alkaline land is not required.

2. Planting of Shrubs a. Soil is irrigated with water to allow salts to penetrate, and shrubs are planted after the water is penetrated. The plant of the shrubs is required to be as dense as possible. And a cover rate of the shrubs on the soil surface is required to be above 80%.

b. A ground surface planted with the shrubs is applied with a layer of the fertilizer for the saline-alkaline land having a thickness of between 2 and 3 cm to prevent water evaporation and enhance the soil remediation.

c. When the shrubs suffer from saline-alkali harms, freshwater is adopted to wash the shrubs to quickly solve the saline-alkali harms.

3. Planting of Ground Cover Plants a. The saline-alkaline land is irrigated with freshwater to be demineralized one week before the planting of the ground cover plants b. After the water penetration is finished, a surface of the saline-alkaline land is applied with a layer of the fertilizer for the saline-alkaline land having a thickness of between 2 and 3 cm and then soil is turned over for a depth of 30 cm and the ground cover plants are laid on the ploughed saline-alkaline land.

4. Seeds Sowing

The earth is ploughed before sowing seeds, the fertilizer is applied to a surface of the earth for the saline-alkaline land to a thickness of 1 cm. Seeds are sowed on the earth while spraying water. Then a layer of fertilizer for the saline-alkaline land having a thickness of 1 cm is applied on a surface of the earth for preventing water evaporation.

III. Configuring Irrigation Facilities

The saline-alkaline land to be treated is thereafter configured with an irrigation system according to practical conditions and a planning scheme to form a water source utilization and auto-cycle mode formed by water source supply, irrigation of land for demineralization, and irrigation of plants. The irrigation system comprises: a brackish water desalination system, a rainwater collecting system, and a water-saving irrigation system.

1. Brackish Water Desalination System

The desalination of the brackish water comprises: a desalting unit, an irrigation network, and a surface drip irrigation-microjet irrigation unit. The desalting unit comprises: a pumped well and a desalting device. The pumped well is connected to a water pump for extracting the underground brine from the pumped well to a brine storage pool. The brine storage pool is connected to an inlet of the desalting device via pipes for desalting the brine. An outlet of the desalting device is connected to the irrigation network, which is connected to the surface drip irrigation-microjet irrigation unit.

2. Rainwater Collecting System

The rainwater collecting system is configured with rainwater collecting units, each of which comprises: a water collecting device, a grit chamber, and a water tank. The water collecting device comprises: a first part for collecting rainwater from roads and a second part for collecting rainwater from architectures. The water collecting device is adapted to effectively collect surface runoff including the rainwater. The surface runoff is primarily filtered by a filter mesh and then introduced to the grit chamber. The grit chamber is connected to the water tank via water discharge pipes. Sand filter devices are disposed on both an inlet and an outlet of the water discharge pipes. The rainwater is introduced to the water tank after being precipitated in the grit chamber and treated by the sand filter devices. A submersible pump is mounted inside the water tank and is connected to the surface drip irrigation-microjet irrigation unit via the irrigation network. The submersible pump and the surface drip irrigation-microjet irrigation unit are provided with controllers which are connected to a water level controller. When the surface drip irrigation-microjet irrigation unit is started, the submersible pump is started by the controller according to the water level in the water tank so as to supply a freshwater source for the surface drip irrigation-microjet irrigation unit.

3. Water-saving Irrigation System

The irrigation network and the surface drip irrigation-microjet irrigation unit are adopted to demineralize the saline-alkaline land. Rainwater or the desalted brackish water is used to irrigate the land according to 20 cubes per mu. The irrigation is performed every two days. After three times alternate irrigation until the salt content of the land is lower than 0.5 wt. %.

Plants in the land are irrigated by using drip irrigation under a film, micro-moist irrigation, and spinning spraying to satisfy the requirement for the growth.

a. The arbors are irrigated using drip irrigation under the film: a water outflow at a drip hole is 2 L/hr, a distance between the drip holes is 30 cm. A length of a drip pipe surrounding the plant pit is between 4 and 5 m, an irrigation time is between 4 and 5 hrs., and the irrigation is conducted once for every 5 or 6 days.

b. The shrubs are irrigated using the micro-moist irrigation: the water outflow of a length unit is 1.5 L/(d.m). Generally, a length of the humid irrigating pipe surrounds the shrubs is between 3 and 4 m. The shrubs are continuously irrigated for 4 d, and stopped irrigation for between 2 and 3 d, and then continued irrigation for another 4 d. Likewise, the irrigation is alternated.

c. The ground cover plants are irrigated by using the spinning spraying. A spraying radium is 4.5 m, a water outflow is 50 L/hr, a spraying time is between 4 and 5 hrs., and a frequency of the spraying is once for every 5 or 6 days.

IV. Managing Ameliorated Soil by Automatic Information Technology

During the amelioration of the saline-alkaline land, a monitoring platform is established to monitor corresponding process parameters and indicators timely to form corresponding control mechanism so that the amelioration of the saline-alkaline land is automatically and effectively accomplished and a set of automatic information mode is formed. After the amelioration of the saline-alkaline land, specific application requirement on the saline-alkaline land is combined to form the managing platform of the saline-alkaline land.

In the saline-alkaline land to be treated, a soil monitoring system is uniformly arranged on a square region having a size of 200 m×200 m to monitor and collect parameters including a salt content, a pH value, a temperature, a humidity, and a soil fertility and transfer the parameters to the monitoring platform for statistical analysis. The monitoring platform gives feedback timely and sends a command to a control system of the region to be treated to control the supply of the water and the fertilizer.

During the amelioration of the saline-alkaline land, an on-line monitor configured to monitor an atmosphere environment, a soil environment, and a vegetation in the square region having the size of 200 m×200 m is connected to the managing platform of the saline-alkaline land. The on-line monitor inputs pre-monitoring information involving the atmosphere, the soil, and the vegetation, and produce related monitoring commands thus realizing the site monitoring of the subjects in the monitored region and giving feedbacks.

In a class of this embodiment, the undersurface pipes in the salt removing system are laid with an interval of between 8 and 25 m, and preferably between 10 and 15 m. For different saline-alkaline land, the soil quality and the penetration are different. The arrangement of the undersurface pipes is correlated with the homogeneity of salt removing, which affects the subsequent growth of the plants. The preferred pipe interval is acquired from many tests based on the severe costal saline-alkaline land and combined with the soil quality and the salt content of the saline-alkaline land.

In a class of this embodiment, in the salt removing system, an effective area for water absorption for each meter of each undersurface pipe is equal to or larger than 31 $cm^2/m$; water inlets of the undersurface pipe are disposed on a bottom of a trough; and a number of the water inlets of a same circle is between 2 and 5. The appropriate number of the water inlets is acquired from many tests based on the severe costal saline-alkaline land and combined with the soil quality and the salt content of the saline-alkaline land. Thus, the service life of the subsurface pipes as well as the water collection and water discharge effects are ensured.

In a class of this embodiment, during the salt-washing and soil conditioning, a salt content of the brackish water is smaller than 0.2 wt. %. By reasonable irrigation using the brackish water and the freshwater, a good salt discharging effect is realized. 0.2% of the salt content in the brackish water is co-soluble with the salt in the saline-alkaline land, so that the leakage efficiency of the salt from the saline-alkaline land is improved.

In a class of this embodiment, in planting the shrubs, a usage of the fertilizer for the saline-alkaline land is 20 $kg/m^2$. Thus, the water evaporation is effectively avoided and the soil restoration is enhanced.

In a class of this embodiment, the compound fertilizer comprises 15 wt. % of nitrogen, 15 wt. % of phosphorus, and 15 wt. % of potassium. By reasonable configuration of the proportion of the components of the fertilizer, the effect of the fertilizer for the saline-alkaline land is better.

Advantages of the method for removing salt from soil in the severe coastal saline-alkaline land according to embodiments of the invention are summarized as follows:

The soil amelioration comprises: construction of the salt removing system, the salt-washing, and the soil conditioning. Thus, the salt drainage of the saline-alkaline land is basically improved, which is beneficial to the growth of the plants. Besides, the brackish water is then desalted and the rainwater is collected for comprehensive use.

Different plants adopt different planting means, and combined with the fertilizer for the saline-alkaline land, the saline-alkaline land is further ameliorated.

The brackish water desalination system is adapted to pump the brackish water from underground and to desalt the brackish water so as to supply freshwater for the amelioration of the saline-alkaline land. The rainwater collecting system is adapted to collect the rainwater and precipitate, filter, and desalting the rainwater, so that the replenishment of the freshwater source is ensured. The water-saving irrigation system is adapted to irrigate the land to be treated before planting and irrigate the plants in and after the planting.

The automatic information technology is adapted to managing the ameliorated soil so as to know the conditions of different parts in time and give corresponding feedbacks at the first time.

In summary, the invention provides a method that is practical and efficient for ameliorating the saline-alkaline land, and a desalting rate reaches higher than 80%.

DETAILED DESCRIPTION OF THE EMBODIMENTS

For further illustrating the invention, experiments detailing a method for removing salt from soil in a severe coastal saline-alkaline land are described below. It should be noted that the following examples are intended to describe and not to limit the invention.

EXAMPLE 1

A method for removing salt from soil in a severe coastal saline-alkaline land, comprises: ameliorating soil, planting saline and alkaline-tolerant plant, configuring irrigation facilities, and managing ameliorated soil by automatic information technology, which are specifically conducted as follows:

I. Soil Amelioration Comprising: Construction of a Salt Removing System, Salt-washing, and Soil Conditioning;

1. Construction of Salt Removing System

The salt removing system adopts open ditches and undersurface pipes. The open ditches, the undersurface pipes, and catch-pipes of the undersurface pipes communicate and work to drain salt.

a. The open ditches are excavated surrounding a saline-alkaline land to be treated. The open ditches have a width of between 0.4 and 0.6 m, a depth of between 0.8 and 1.6 m, and a slop of between 0.1% and 0.3%.

b. A salt-discharging pipe network is laid under a ground surface of the saline-alkaline land to be treated. The salt-discharging pipe network is formed by the undersurface pipes and the catch-pipes. The undersurface pipes are single-wall perforated corrugated pipes made of polyethylene, and a pipe diameter of the undersurface pipe is 110 mm. The undersurface pipes are wrapped with a layer of a sand filter material having a thickness of between 6 and 8 mm to prevent soil powder from blocking the undersurface pipes. The adopted sand filter material is natural sands of uniform size. The undersurface pipes are laid at an interval of between 10 and 15 m, and a top of each undersurface pipe is disposed at a depth of between 80 and 100 cm away from the ground surface of the saline-alkaline land. The undersurface pipes are laid at a slop of 0.5‰ according to the drainage direction of the soil layer of the saline-alkaline land, and rear ends of the undersurface pipes are all connected to the catch-pipes. The catch-pipes are PVC-U pipes having a diameter of 200 mm and are laid at a slop of 0.7‰.

2. Salt-washing and Soil Conditioning a. soil above an eluvial horizon is turned over by an excavator. After the earth is dried, the soil is added with a soil conditioner, mechanically crushed and mixed. The soil conditioner is formed by between 2 and 5 parts by weight of sand, between 1 and 2 parts by weight of a straw, and between 0.3 and 1 part by weight of a desulfurized gypsum according to every 20 parts by weight of the soil.

b. the crushed and mixed soil is irrigated by using water pipes or sprinklers to enable the salt in the soil to seep along with water until a salt content in the soil is below 0.5%, in which, brackish water is employed in a first period of the water-washing, and freshwater is employed in a last period of the water-washing.

c. a fertilizer is applied to the saline-alkaline land, in which, the fertilizer comprises: 48 parts by weight of a sheep/dairy manure, 12 parts by weight of a biological carbon, 22 parts by weight of a furfural residue, 0.5 part by weight of a water retaining agent, 8 parts by weight of a pyroligneous acid, 6 parts by weight of calcium superphosphate, and 4 parts by weight of a compound fertilizer. The compound fertilizer comprises 15 wt. % of nitrogen, 15 wt. % of phosphorus, and 15 wt. % of potassium. The specific use of the fertilizer for the saline-alkaline land is illustrated hereinbelow.

II. Planting Saline and Alkaline-tolerant Plant

1. Planting Arbors a. an earth ball encircling roots of the arbor has a diameter of being between 6 and 8 folds of a diameter at breast height, and a diameter of a plant pit is 40 cm larger than the earth ball.

b. water is filled into the plant pit before planting, and subsequent operation is conducted after the water penetration is finished.

c. a layer of the fertilizer for the saline-alkaline land having a thickness of between 2 and 3 cm is applied in the plant pit, the arbor is then planted, during which, the original soil and the fertilizer for the saline-alkaline land are mixed according to a weight ratio of 2:1 to fix the earth ball of the arbor in the plant pit until a surface of the mixture being between 5 and 10 cm below the ground surface.

d. the arbor is irrigated and covered with the original soil to a position above the ground surface to form a cofferdam. Thereafter, a layer of the fertilizer for the saline-alkaline land having a thickness of between 2 and 3 cm is covered in the vicinity of the plant pit and the cofferdam.

e. The arbor is supported by a bracket after planting.

f. The fertilizer for the saline-alkaline land is applied according to practical condition. Salt content of the soil layer encircling the roots is dynamically detected. When the salt content is below 0.1 wt. %, the fertilizer for the saline-alkaline land is not required.

2. Planting of Shrubs a. Soil is irrigated with water to allow salts to penetrate, and shrubs are planted after the water is penetrated. The plant of the shrubs is required to be as dense as possible. And a cover rate of the shrubs on the soil surface is required to be above 80%.

b. A ground surface planted with the shrubs is applied with a layer of the fertilizer for the saline-alkaline land having a thickness of between 2 and 3 cm to prevent water evaporation and enhance the soil remediation.

c. When the shrubs suffer from saline-alkali harms, freshwater is adopted to wash the shrubs to quickly solve the saline-alkali harms.

3. Planting of Ground Cover Plants a. The saline-alkaline land is irrigated with freshwater to be demineralized one week before the planting of the ground cover plants b. After the water penetration is finished, a surface of the saline-alkaline land is applied with a layer of the fertilizer for the saline-alkaline land having a thickness of between 2 and 3 cm and then soil is turned over for a depth of 30 cm and the ground cover plants are laid on the ploughed saline-alkaline land.

4. Seeds Sowing

The earth is ploughed before sowing seeds, the fertilizer is applied to a surface of the earth for the saline-alkaline land to a thickness of 1 cm. Seeds are sowed on the earth while spraying water. Then a layer of fertilizer for the saline-alkaline land having a thickness of 1 cm is applied on a surface of the earth for preventing water evaporation.

III. Configuring Irrigation Facilities

The saline-alkaline land to be treated is thereafter configured with an irrigation system according to practical conditions and a planning scheme to form a water source utilization and auto-cycle mode formed by water source supply, irrigation of land for demineralization, and irrigation of plants. The irrigation system comprises: a brackish water desalination system, a rainwater collecting system, and a water-saving irrigation system.

1. Brackish Water Desalination System

The desalination of the brackish water comprises: a desalting unit, an irrigation network, and a surface drip irrigation-microjet irrigation unit. The desalting unit comprises: a pumped well and a desalting device. The pumped well is connected to a water pump for extracting the underground brine from the pumped well to a brine storage pool. The brine storage pool is connected to an inlet of the desalting device via pipes for desalting the brine. An outlet of the desalting device is connected to the irrigation network, which is connected to the surface drip irrigation-microjet irrigation unit.

2. Rainwater Collecting System

The rainwater collecting system is configured with rainwater collecting units, each of which comprises: a water collecting device, a grit chamber, and a water tank. The water collecting device comprises: a first part for collecting rainwater from roads and a second part for collecting rainwater from architectures. The water collecting device is adapted to effectively collect surface runoff including the rainwater. The surface runoff is primarily filtered by a filter mesh and then introduced to the grit chamber. The grit chamber is connected to the water tank via water discharge pipes. Sand filter devices are disposed on both an inlet and an outlet of the water discharge pipes. The rainwater is introduced to the water tank after being precipitated in the grit chamber and treated by the sand filter devices. A submersible pump is mounted inside the water tank and is connected to the surface drip irrigation-microjet irrigation unit via the irrigation network. The submersible pump and the surface drip irrigation-microjet irrigation unit are provided with controllers which are connected to a water level controller. When the surface drip irrigation-microjet irrigation unit is started, the submersible pump is started by the controller according to the water level in the water tank so as to supply a freshwater source for the surface drip irrigation-microjet irrigation unit.

3. Water-saving Irrigation System

The irrigation network and the surface drip irrigation-microjet irrigation unit are adopted to demineralize the saline-alkaline land. Rainwater or the desalted brackish water is used to irrigate the land according to 20 cubes per mu. The irrigation is performed every two days. After three times alternate irrigation until the salt content of the land is lower than 0.5 wt. %.

Plants in the land are irrigated by using drip irrigation under a film, micro-moist irrigation, and spinning spraying to satisfy the requirement for the growth.

a. The arbors are irrigated using drip irrigation under the film: a water outflow at a drip hole is 2 L/hr, a distance between the drip holes is 30 cm. A length of a drip pipe surrounding the plant pit is between 4 and 5 m, an irrigation time is between 4 and 5 hrs., and the irrigation is conducted once for every 5 or 6 days.

b. The shrubs are irrigated using the micro-moist irrigation: the water outflow of a length unit is 1.5 L/(d.m). Generally, a length of the humid irrigating pipe surrounds the shrubs is between 3 and 4 m. The shrubs are continuously irrigated for 4 d, and stopped irrigation for between 2 and 3 d, and then continued irrigation for another 4 d. Likewise, the irrigation is alternated.

c. The ground cover plants are irrigated by using the spinning spraying. A spraying radium is 4.5 m, a water outflow is 50 L/hr, a spraying time is between 4 and 5 hrs., and a frequency of the spraying is once for every 5 or 6 days.

IV. Managing Ameliorated Soil by Automatic Information Technology

During the amelioration of the saline-alkaline land, a monitoring platform is established to monitor corresponding process parameters and indicators timely to form corresponding control mechanism so that the amelioration of the saline-alkaline land is automatically and effectively accomplished and a set of automatic information mode is formed. After the amelioration of the saline-alkaline land, specific application requirement on the saline-alkaline land is combined to form the managing platform of the saline-alkaline land.

In the saline-alkaline land to be treated, a soil monitoring system is uniformly arranged on a square region having a size of 200 m×200 m to monitor and collect parameters including a salt content, a pH value, a temperature, a humidity, and a soil fertility and transfer the parameters to the monitoring platform for statistical analysis. The monitoring platform gives feedback timely and sends a command to a control system of the region to be treated to control the supply of the water and the fertilizer.

During the amelioration of the saline-alkaline land, an on-line monitor configured to monitor an atmosphere environment, a soil environment, and a vegetation in the square region having the size of 200 m×200 m is connected to the managing platform of the saline-alkaline land. The on-line monitor inputs pre-monitoring information involving the atmosphere, the soil, and the vegetation, and produce related monitoring commands thus realizing the site monitoring of the subjects in the monitored region and giving feedbacks.

The construction of the saline-alkaline land to be treated is accomplished based on a combination of the soil amelioration and the establishment of the vegetation system.

Before soil amelioration, the saline-alkaline land has a soil content of higher than 0.65%, a pH value of 8.6, a content of an ammonium nitrogen of 5.62 mg/kg, a content of an available phosphorous of 10.3 mg/kg, an available potassium of 35.5 mg/kg, and a content of an organic substance of 0.9%.

After three months of soil amelioration, the salt content is decreased to 0.126%, and the desalinization ratio is 80.6%. Thus, it is demonstrated that the soil amelioration method of the invention is adapted to reduce the salt content in the soil to a level that allows the general salt-tolerant plants to grow as well as obviously improve the physicochemical properties. After the treatment of the method, the soil becomes fertile and water preservable; in addition, the increase of the salt content never happens again.

EXAMPLE 2

1. Construction of Salt Removing System

The salt removing system adopts open ditches and undersurface pipes. The open ditches, the undersurface pipes, and catch-pipes of the undersurface pipes communicate and work to drain salt.

a. The open ditches are excavated surrounding a saline-alkaline land to be treated. The open ditches have a width of between 0.4 and 0.6 m, a depth of between 0.8 and 1.6 m, and a slop of between 0.1% and 0.3%.

b. A salt-discharging pipe network is laid under a ground surface of the saline-alkaline land to be treated. The salt-discharging pipe network is formed by the undersurface pipes and the catch-pipes. The undersurface pipes are single-wall perforated corrugated pipes made of polyethylene, and a pipe diameter of the undersurface pipe is 110 mm. The undersurface pipes are wrapped with a layer of a sand filter material having a thickness of between 6 and 8 mm to prevent soil powder from blocking the undersurface pipes.

The adopted sand filter material is natural sands of uniform size. The undersurface pipes are laid at an interval of 20 m, and a top of each undersurface pipe is disposed at a depth of 160 cm away from the ground surface of the saline-alkaline land. The undersurface pipes are laid at a slop of 0.5‰ according to the drainage direction of the soil layer of the saline-alkaline land, and rear ends of the undersurface pipes are all connected to the catch-pipes. The catch-pipes are PVC-U pipes having a diameter of 200 mm and are laid at a slop of 0.7‰.

Other technical schemes are the same as those in Example 1.

The construction of the saline-alkaline land to be treated is accomplished based on a combination of the soil amelioration and the establishment of the vegetation system.

Before soil amelioration, the saline-alkaline land has a soil content of higher than 0.65%, a pH value of 8.6, a content of an ammonium nitrogen of 5.62 mg/kg, a content of an available phosphorous of 10.3 mg/kg, an available potassium of 35.5 mg/kg, and a content of an organic substance of 0.9%.

After three months of soil amelioration, the salt content is decreased to 0.258%, and the desalinization ratio is 60.3%. Thus, it is demonstrated that the soil amelioration method of the invention is adapted to reduce the salt content in the soil to a level that allows the general salt-tolerant plants to grow as well as obviously improve the physicochemical properties. After the treatment of the method, the soil becomes fertile and water preservable; in addition, the increase of the salt content never happens again.

EXAMPLE 3

1. Construction of Salt Removing System

The salt removing system adopts open ditches and undersurface pipes. The open ditches, the undersurface pipes, and catch-pipes of the undersurface pipes communicate and work to drain salt.

a. The open ditches are excavated surrounding a saline-alkaline land to be treated. The open ditches have a width of between 0.4 and 0.6 m, a depth of between 0.8 and 1.6 m, and a slop of between 0.1% and 0.3%.

b. A salt-discharging pipe network is laid under a ground surface of the saline-alkaline land to be treated. The salt-discharging pipe network is formed by the undersurface pipes and the catch-pipes. The undersurface pipes are single-wall perforated corrugated pipes made of polyethylene, and a pipe diameter of the undersurface pipe is 110 mm. The undersurface pipes are wrapped with a layer of a sand filter material having a thickness of between 6 and 8 mm to prevent soil powder from blocking the undersurface pipes. The adopted sand filter material is natural sands of uniform size. The undersurface pipes are laid at an interval of between 10 and 15 m, and a top of each undersurface pipe is disposed at a depth of 80 cm away from the ground surface of the saline-alkaline land. The undersurface pipes are laid at a slop of 0.5‰ according to the drainage direction of the soil layer of the saline-alkaline land, and rear ends of the undersurface pipes are all connected to the catch-pipes. The catch-pipes are PVC-U pipes having a diameter of 200 mm and are laid at a slop of 0.7‰.

Other technical schemes are the same as those in Example 1.

The construction of the saline-alkaline land to be treated is accomplished based on a combination of the soil amelioration and the establishment of the vegetation system.

Before soil amelioration, the saline-alkaline land has a soil content of higher than 0.65%, a pH value of 8.6, a content of an ammonium nitrogen of 5.62 mg/kg, a content of an available phosphorous of 10.3 mg/kg, an available potassium of 35.5 mg/kg, and a content of an organic substance of 0.9%.

After three months of soil amelioration, the salt content is decreased to 0.183%, and the desalinization ratio is 71.8%. Thus, it is demonstrated that the soil amelioration method of the invention is adapted to reduce the salt content in the soil to a level that allows the general salt-tolerant plants to grow as well as obviously improve the physicochemical properties. After the treatment of the method, the soil becomes fertile and water preservable; in addition, the increase of the salt content never happens again.

EXAMPLE 4

The method for desalting the soil is the same as that of example 1 except that components for the fertilizer for the saline-alkaline land are as follows: 40 parts by weight of a sheep/dairy manure, 10 parts by weight of a biological carbon, 18 parts by weight of a furfural residue, 0.3 part by weight of a water retaining agent, 4 parts by weight of a pyroligneous acid, 2 parts by weight of calcium superphosphate, and 4 parts by weight of a compound fertilizer. The compound fertilizer comprises 15 wt. % of nitrogen, 15 wt. % of phosphorus, and 15 wt. % of potassium.

It is demonstrated that the method of the invention is able to effectively ameliorate the soil of the saline-alkaline land, and one year after the planting, the pH value of the soil is obviously reduced, the salt content in the soil is lowered, and the survival rates of the arbors, shrubs, and the ground cover plants are greatly larger than those in the saline-alkaline land not been treated by the method of the invention.

EXAMPLE 5

The method for desalting the soil is the same as that of example 1 except that components for the fertilizer for the saline-alkaline land are as follows: 45 parts by weight of a sheep/dairy manure, 14 parts by weight of a biological carbon, 20 parts by weight of a furfural residue, 0.4 part by weight of a water retaining agent, 6 parts by weight of a pyroligneous acid, 5 parts by weight of calcium superphosphate, and 5 parts by weight of a compound fertilizer. The compound fertilizer comprises 15 wt. % of nitrogen, 15 wt. % of phosphorus, and 15 wt. % of potassium.

It is demonstrated that the method of the invention is able to effectively ameliorate the soil of the saline-alkaline land, and one year after the planting, the pH value of the soil is obviously reduced, the salt content in the soil is lowered, and the survival rates of the arbors, shrubs, and the ground cover plants are greatly larger than those in the saline-alkaline land not been treated by the method of the invention.

EXAMPLE 6

The method for desalting the soil is the same as that of example 1 except that components for the fertilizer for the saline-alkaline land are as follows: 50 parts by weight of a sheep/dairy manure, 16 parts by weight of a biological carbon, 24 parts by weight of a furfural residue, 0.6 part by weight of a water retaining agent, 10 parts by weight of a pyroligneous acid, 8 parts by weight of calcium superphosphate, and 6 parts by weight of a compound fertilizer. The compound fertilizer comprises 15 wt. % of nitrogen, 15 wt. % of phosphorus, and 15 wt. % of potassium.

It is demonstrated that the method of the invention is able to effectively ameliorate the soil of the saline-alkaline land, and one year after the planting, the pH value of the soil is obviously reduced, the salt content in the soil is lowered, and the survival rates of the arbors, shrubs, and the ground cover plants are greatly larger than those in the saline-alkaline land not been treated by the method of the invention.

The saline-alkaline land not been treated by the method of the invention is taken as a blank control group, and comparisons of parameters of the planting results among the blank control groups and Examples 4-6 are listed in Tables 1-3.

TABLE 1

Comparisons of parameters involving planting of arbors

| Indicators | Blank control | Example 4 | Example 5 | Example 6 |
|---|---|---|---|---|
| Survival rate of arbors | 46.3% | 93.2% | 95.5% | 94.1% |
| pH value of soil | 9.26 | 8.32 | 7.91 | 7.63 |
| Salt content of soil | 0.615 | 0.186 | 0.168 | 0.173 |

TABLE 2

Comparisons of parameters involving planting of shrubs

| Indicators | Blank control | Example 4 | Example 5 | Example 6 |
|---|---|---|---|---|
| Survival rate of shrubs | 56.4% | 96.3% | 97.4% | 95.3% |
| pH value of soil | 9.26 | 8.11 | 7.69 | 7.51 |
| Salt content of soil | 0.615 | 0.178 | 0.159 | 0.164 |

TABLE 3

Comparisons of parameters involving planting of ground cover plants

| Indicators | Blank control | Example 4 | Example 5 | Example 6 |
|---|---|---|---|---|
| Survival rate of ground cover plants | 73.4% | 98.1% | 99.0% | 97.3% |
| pH value of soil | 9.26 | 8.21 | 8.07 | 7.65 |
| Salt content of soil | 0.615 | 0.175 | 0.158 | 0.177 |

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for removing salt from soil in a severe coastal saline-alkaline land, the method comprising:

I. ameliorating soil, which comprises: 1) constructing a salt removing system formed by open ditches, undersurface pipes, and catch-pipes; 2) soil conditioning and salt washing, comprising: turning over earth above an eluvial horizon, drying the soil, and adding a soil conditioner to the soil; irrigating the soil to allow salt to penetrate downward; and applying a fertilizer to the soil; wherein, in the salt removing system, the open ditches, the undersurface pipes, and catch-pipes communicate and work to drain the salt; the salt removing system is established as follows:

a. the open ditches having a width of between 0.4 and 0.6 m, a depth of between 0.8 and 1.6 m, and a slope of between 0.1% and 0.3% are excavated surrounding a saline-alkaline land to be treated;

b. a salt-discharging pipe network formed by the undersurface pipes and the catch-pipes is laid under a ground surface of the saline-alkaline land to be treated; the undersurface pipes are single-wall perforated corrugated pipes made of polyethylene, and a pipe diameter of the undersurface pipe is 110 mm; the undersurface pipes are wrapped with a layer of a sand filter material having a thickness of between 6 and 8 mm; the adopted sand filter material is natural sands of uniform size; the undersurface pipes are laid at an interval of between 5 and 30 m, and a top of each undersurface pipe is disposed at a depth of between 80 and 160 cm away from the ground surface of the saline-alkaline land; the undersurface pipes are laid at a slope of 0.5% c according to the drainage direction of the soil layer of the saline-alkaline land, and rear ends of the undersurface pipes are all connected to the catch-pipes; the catch-pipes are PVC-U pipes having a diameter of 200 mm and are laid at a slope of 0.7% and the salt-washing and soil conditioning are conducted as follows:

a. soil above the eluvial horizon is turned over by an excavator; after the earth is dried, the soil is added with the soil conditioner, crushed and mixed; the soil conditioner is formed by between 2 and 5 parts by weight of sand, between 1 and 2 parts by weight of a straw, and between 0.3 and 1 part by weight of a desulfurized gypsum according to every 20 parts by weight of the soil;

b. the crushed and mixed soil is irrigated by using water pipes or sprinklers to enable the salt in the soil to seep along with water until a salt content in the soil is below 0.5%, in which, brackish water is employed in a first period of the water-washing, and freshwater is employed in a last period of the water-washing; and c. a fertilizer is applied to the saline-alkaline land, in which, the fertilizer comprises: between 40 and 50 parts by weight of a sheep/dairy manure, between 10 and 16 parts by weight of a biological carbon, between 18 and 24 parts by weight of a furfural residue, between 0.3 and 0.6 part by weight of a water retaining agent, between 4 and 10 parts by weight of a pyroligneous acid, between 2 and 8 parts by weight of calcium superphosphate, and between 4 and 6 parts by weight of a compound fertilizer;

II. planting saline and alkaline-tolerant plant comprising arbors, shrubs, and ground cover plants, and sowing seeds; wherein, the arbors are planted as follows:

a. the arbors are selected having an earth ball encircling roots of the arbor satisfying a diameter of being between 6 and 8 folds of a diameter at breast height and a diameter of a plant pit being 40 cm larger than the earth ball:

b. water is filled into the plant pit before planting, and subsequent operation is conducted after the water penetration is finished;

c. a layer of the fertilizer for the saline-alkaline land having a thickness of between 2 and 3 cm is applied in the plant pit, the arbor is then planted, during which, the original soil and the fertilizer for the saline-alkaline land are mixed according to a weight ratio of 2:1 to fix the earth ball of the arbor in the plant pit until a surface of the mixture being between 5 and 10 cm below the ground surface;
d. the arbor is irrigated and covered with the original soil to a position above the ground surface to form a cofferdam; a layer of the fertilizer for the saline-alkaline land having a thickness of between 2 and 3 cm is covered in the vicinity of the plant pit and the cofferdam;
e. the arbor is supported by a bracket after planting; and
f. the fertilizer for the saline-alkaline land is applied according to practical condition; salt content of the soil layer encircling the roots is dynamically detected; when the salt content is below 0.3 wt. %, applying of the fertilizer is stopped;

the shrubs are planted as follows:
a. soil is irrigated with water to allow salts to penetrate, and shrubs are planted after the water penetration is finished; and a cover rate of the shrubs on the soil surface is required to be above 80%;
b. a ground surface planted with the shrubs is applied with a layer of the fertilizer for the saline-alkaline land having a thickness of between 2 and 3 cm; and
c. when the shrubs suffer from saline-alkali harms, freshwater is used to wash the shrubs;

the ground cover plants are planted as follows:
a. the saline-alkaline land is irrigated with freshwater to be demineralized one week before the planting of the ground cover plants;
b. after the water penetration is finished, a surface of the saline-alkaline land is applied with a layer of the fertilizer for the saline-alkaline land having a thickness of between 2 and 3 cm and then soil is turned over for a depth of 30 cm and the ground cover plants are laid on the ploughed saline-alkaline land; and the seeds are sowed as follows:
the earth is ploughed before sowing seeds, the fertilizer is applied to a surface of the earth for the saline-alkaline land to a thickness of 1 cm; seeds are sowed on the earth while spraying water; then a layer of fertilizer for the saline-alkaline land having a thickness of 1 cm is applied on a surface of the earth;

III. configuring an irrigation system, the irrigation system comprising: a brackish water desalination system, a rainwater collecting system, and a water-saving irrigation system;
wherein, the brackish water desalination system comprises: a desalting unit, an irrigation network, and a surface drip irrigation-microjet irrigation unit; the desalting unit comprises: a pumped well and a desalting device; the pumped well is connected to a water pump for extracting the underground brine from the pumped well to a brine storage pool; the brine storage pool is connected to an inlet of the desalting device via pipes for desalting the brine; an outlet of the desalting device is connected to the irrigation network, which is connected to the surface drip irrigation-microjet irrigation unit;
the rainwater collecting system is configured with rainwater collecting units, each of which comprises: a water collecting device, a grit chamber, and a water tank; the water collecting device comprises: a first part for collecting rainwater from roads and a second part for collecting rainwater from architectures; the water collecting device is adapted to collect surface runoff including the rainwater; the surface runoff is primarily filtered by a filter mesh and then introduced to the grit chamber; the grit chamber is connected to the water tank via water discharge pipes; sand filter devices are disposed on both an inlet and an outlet of the water discharge pipes; the rainwater is introduced to the water tank after being precipitated in the grit chamber and treated by the sand filter devices; a submersible pump is mounted inside the water tank and is connected to the surface drip irrigation-microjet irrigation unit via the irrigation network; the submersible pump and the surface drip irrigation-microjet irrigation unit are provided with controllers which are connected to a water level controller; when the surface drip irrigation-microjet irrigation unit is started, the submersible pump is started by the controller according to the water level in the water tank so as to supply a freshwater source for the surface drip irrigation-microjet irrigation unit;
the irrigation network and the surface drip irrigation-microjet irrigation unit are adopted to demineralize the saline-alkaline land; rainwater or the desalted brackish water is used to irrigate the land according to 20 cubes per mu; the irrigation is performed every two days; after three times alternate irrigation until the salt content of the land is lower than 0.5 wt. %;
plants in the land are irrigated by using drip irrigation under a film, micro-moist irrigation, and spinning spraying to satisfy the requirement for the growth;
a. the arbors are irrigated using drip irrigation under the film: a water outflow at a drip hole is 2 L/hr, a distance between the drip holes is 30 cm; a length of a drip pipe surrounding the plant pit is between 4 and 5 m, an irrigation time is between 4 and 5 hrs., and the irrigation is conducted once for every 5 or 6 days;
b. the shrubs are irrigated using the micro-moist irrigation: the water outflow of a length unit is 1.5 L/(d.m); a length of the humid irrigating pipe surrounds the shrubs is between 3 and 4 m; the shrubs are continuously irrigated for 4 days, and stopped irrigation for between 2 and 3 days, and then continued irrigation for another 4 days;
c. the ground cover plants are irrigated by using the spinning spraying; a spraying radium is 4.5 m, a water outflow is 50 L/hr, a spraying time is between 4 and 5 hrs., and a frequency of the spraying is once for every 5 or 6 days;

IV. managing ameliorated soil, comprising: establishing a monitoring platform, monitoring corresponding process parameters and indicators, and sending monitoring commands;
wherein, during the amelioration of the saline-alkaline land, a monitoring platform is established to monitor corresponding process parameters and indicators timely to form corresponding control mechanism; after the amelioration of the saline-alkaline land, specific application requirement on the saline-alkaline land is combined to form the managing platform of the saline-alkaline land;
in the saline-alkaline land to be treated, a soil monitoring system is uniformly arranged on a square region having a size of 200 m×200 m to monitor and collect parameters including a salt content, a pH value, a temperature, a humidity, and a soil fertility and transfer the parameters to the monitoring platform for statistical analysis; the monitoring platform gives feedback timely and sends a command to a control system of the region to be treated to control the supply of the water and the fertilizer; and during the amelioration of the saline-alkaline land, an on-line monitor configured to monitor an atmosphere environment, a soil environment, and a vegetation in the square region having the size of 200 m×200 m is connected to the managing platform of the saline-alkaline land; the on-line monitor inputs pre-monitoring information involving the atmosphere, the soil, and the vegetation, and produce related monitoring commands thus realizing the site monitoring of the subjects in the monitored region and giving feedbacks.

2. The method of claim 1, wherein the undersurface pipes in the salt removing system are laid with an interval of between 8 and 25 m.

3. The method of claim 2, wherein the undersurface pipes in the salt removing system are laid with an interval of between 10 and 15 m.

4. The method of claim 1, wherein the salt removing system, an effective area for water absorption for each meter of each undersurface pipe is equal to or larger than $31 cm^2/m$; water inlets of the undersurface pipe are disposed on a bottom of a trough; and a number of the water inlets of a same circle is between 2 and 5.

5. The method of claim 1, wherein the salt removing system, water inlets of the undersurface pipe are disposed on a bottom of a trough; and a number of the water inlets of a same circle is between 2 and 5.

6. The method of claim 1, wherein during the salt-washing and soil conditioning, a salt content of the brackish water is smaller than 0.2 wt. %.

7. The method of claim 1, wherein the planting the shrubs, a usage of the fertilizer for the saline-alkaline land is 20 $kg/m^2$.

8. The method of claim1, wherein the compound fertilizer comprises 15 wt. % of nitrogen, 15 wt% of phosphorus, and 15 wt. % of potassium.

* * * * *